(No Model.)
C. WILLMS.
SEALED BATTERY CELL OR SIMILAR ARTICLE.
No. 479,541. Patented July 26, 1892.
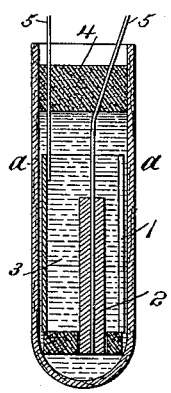

UNITED STATES PATENT OFFICE.

CHARLES WILLMS, OF BALTIMORE, MARYLAND.

SEALED BATTERY-CELL OR SIMILAR ARTICLES.

SPECIFICATION forming part of Letters Patent No. 479,541, dated July 26, 1892.

Application filed April 30, 1892. Serial No. 431,246. (No model.)

*To all whom it may concern:*

Be it known that I, CHARLES WILLMS, a citizen of the United States, residing at Baltimore city, State of Maryland, have invented certain new and useful Improvements in Sealed Battery-Cells or Similar Articles, fully described and represented in the following specification and the accompanying drawing, forming a part of the same.

The object of the present invention is to provide an improved construction of battery-cell or similar tubular article made of glass or other fragile material and having an end-sealing plug of plastic material which expands on setting, whereby breakage by such expansion shall be prevented.

The invention is of general application in all arts employing such constructions; but this invention has been designed especially in connection with the cells used in small portable electric batteries, such as the chloride-of-silver dry cell shown and described in Patents Nos. 421,801, 437,467, 450,840, and other patents previously granted to me. In these batteries the cell containing the battery materials consists of a tube of glass or similar material sealed by an end plug formed of plaster-of-paris or similar material which expands upon setting, so as to seal the cell tightly and prevent leakage of the battery fluid. It is found in practice that the expansion of the plaster-of-paris or similar material in setting is liable to burst the cell. I avoid this by placing the material forming the plug inside the end of the cell, so that the pressure of the expanding material is not sustained by the edges of the cells, but by the walls of the cell at a sufficient distance therefrom to afford the required support. With this construction I find that the plug may be made so tight prior to setting that a perfect sealing is secured on the expansion of the material, while all danger of breaking the cell is avoided.

In the accompanying drawing, illustrating my invention as applied to a dry cell of the construction shown in the patents above referred to, *a* is the cell, consisting of a tube formed of glass or similar fragile material, permanently closed at one end and containing the battery elements, consisting of the zinc plate 1, chloride-of-silver rod 2, and the sulphate of zinc 3, the open end of the cell being sealed by a plug 4, through which the conductors 5 pass. The plug 4 may be formed in several parts, as in the patents above referred to; but in the present case I have shown only the outer part or plug proper by which the cell is sealed. This plug 4 is formed of plaster-of-paris or similar plastic material which expands on setting, this material being packed into the open end of the cell about the conductors 5, so as to hold the latter firmly in position and seal the cell tightly when it expands on setting. The end of the cell-case is preferably turned inwardly at one or more points, as shown in the patents above referred to, so as to hold the plug firmly in place against being driven out by the expansive force of the battery elements; but this is not absolutely necessary.

It will be seen that the cell differs from those shown in the patents above referred to in that the plug 4, instead of being placed flush with the edges of the cell *a*, is placed inside the end of the cell, so that the expansive force of the setting plaster is not sustained by the edges of the cell, but by the walls of the cell inside the edges a sufficient distance to insure the requisite support to prevent breakage.

It will be understood that my invention is not to be limited to battery-cells nor to the special form of tube shown sealed at only one end, but that my invention is applicable to all constructions employing a tube of glass or similar fragile material sealed by a plug of material which expands on setting.

What I claim is—

1. A battery-cell or similar tubular article of glass or similar fragile material having its end sealed by a plug of plastic material which expands on setting, placed inside the end of the tube a sufficient distance to remove the strain of the expansion of the plastic material from the edges of the tube, whereby the breakage of the tube by such expansion is prevented, substantially as described.

2. A battery-cell consisting of a tube of glass or similar fragile material containing the battery elements, said tube being permanently closed at one end and sealed at the open end by a plug of plastic material which expands on setting, said plastic material being packed about the conductors and placed inside the end of the cell a sufficient distance to remove the strain of the expansion of the plastic material from the edges of the cell, whereby the breakage of the cell by expansion is prevented, substantially as described.

In testimony whereof I have hereunto set my hand in the presence of two subscribing witnesses.

CHARLES WILLMS.

Witnesses:
H. G. ENSOR,
WM. H. JONES.